United States Patent [19]

Bryan

[11] Patent Number: 4,888,149
[45] Date of Patent: Dec. 19, 1989

[54] WEAR-REDUCTION-SHIELD FOR THIMBLES

[75] Inventor: William J. Bryan, Granby, Conn.

[73] Assignee: Combustion Engineering, Inc., Windsor, Conn.

[21] Appl. No.: 250,057

[22] Filed: Sep. 27, 1988

[51] Int. Cl.$^4$ .................. G21C 11/00; G21C 17/00
[52] U.S. Cl. .................................. 376/287; 376/254; 376/292; 376/352
[58] Field of Search ............... 376/254, 292, 245, 352, 376/463, 362, 287, 353, 204, 203; 403/384, 375

[56] References Cited

U.S. PATENT DOCUMENTS

| | | | |
|---|---|---|---|
| 4,716,004 | 12/1987 | Merkovsky et al. | 376/245 |
| 4,717,529 | 1/1988 | Merkovsky et al. | 376/245 |
| 4,751,039 | 6/1988 | Delevallee et al. | 376/254 |
| 4,765,944 | 8/1988 | Heuze et al. | 376/245 |
| 4,778,647 | 10/1988 | Gasparro | 376/245 |

Primary Examiner—Daniel Wasil
Attorney, Agent, or Firm—John H. Mulholland

[57] ABSTRACT

A wear-reduction-shield (40) for use between the core plate (24) and lower end fitting (26) of a pressurized water reactor (10) to reduce excessive wear of in-core-instrumentation thimbles (30) due to flow induced vibrations and resist fuel assembly tipping has a cylindrical body portion 42, with core plate engaging lower end surface (44). At the opposite and upper end, a tapered internal end wall (46) assists upward threading of the monitor and cable. On the outside of the upper end symmetrical leg portions (52) and central land (54) surround a thimble (30) receiving opening (48). Smoothly tapering outer surface (56) minimizes turbulence in and beyond opening (34) in lower end fitting (26). Internal dimensions of shield (40) avoid structure such as sleeve (50) which may be present.

4 Claims, 2 Drawing Sheets

WEAR-REDUCTION-SHIELD FOR THIMBLES

BACKGROUND OF THE INVENTION

In-core-instrumentation (ICI) thimbles in several pressurized water reactor (PWR) systems have experienced excessive wear due to flow induced vibrations. This situation has led to the early and costly replacement of ICI thimbles at various plants. In a typical arrangement of a PWR with bottom mounted ICIs, the thimbles are inserted from a seal table through guide tubes and through vessel penetrations into the reactor. From there they are guided, by instrument thimble guide tubes, through the lower support structure and further on through a centrally located tube of certain fuel assemblies to the desired location and elevation within the fuel core. These ICI thimbles provide the guide path for insertion of moveable nuclear flux detectors used for reactor operation. The lower regions of fuel assemblies include very narrow annuli within the fuel assembly flow distribution plate (FDP), nozzle block or lower end fitting, where the majority of ICI thimble wear has been observed.

Several researchers have investigated the flow induced vibration aspects in this region. Gorman et al, in a paper presented in May of 1987 at the Flow-Induced Vibration Conference, BHRA, Bowness-on-Windermere, England, have attributed, for a certain geometry, the predominant flow dependent forcing mechanism to that of axial exit divergence flow from the thimble guide tube. The driving force for this flow stream is the pressure drop that exists during normal operation between the bottom of the ICI thimble guide tube (in the lower reactor vessel head region) and the top of the thimble guide tube (at the core support plate).

The invention is for use to limit wear of ICI thimble guide tubes thus extending their useful life, and is in the form of a special flow induced vibration reduction-/wear-reduction-shield. It also provides an additional support leg for the fuel assembly lower end plate and thus acts as a fuel assembly anti-tipping device.

DESCRIPTION OF THE RELATED ART

Attempts at solving the problem of ICI thimble wear due to a significant portion of the thimbles being exposed to turbulence in the region between the upper surface of the core support plate and the lower surface of the fuel assembly flow distribution plate, can be found discussed in U.S. Pat. No. 4,716,004. In that patent, the idea of fully shielding the thimble in this region by means of solid guides is discussed and disparaged because of manufacturing tolerance problems.

Another invention assigned to Combustion Engineering, Inc., assignee of the instant invention, was filed by Haslinger et al on July 28, 1988. The inventors' investigation in that case involved construction of an instrumented flow visualization model which was used to investigate the vibrational behavior of ICI thimbles in the original plant configuration as well as for several wear-reduction-sleeve designs.

SUMMARY OF THE INVENTION

The wear-reduction-shield of the instant invention is for use on in-core-instrumentation thimbles of pressurized water nuclear reactors to curtail flow induced excitation and to increase support for the fuel assembly against tipping relative to the core plate.

The shield is a hollow generally cylindrical body which surrounds the thimble and any sleeve-like structure such as an extender or a sleeve for collecting and diverting thimble flow between a fuel assembly and a core plate. It has radially extending symmetrically placed leg members for contact with the fuel assembly and a cylindrical surface normal to its axis for contact with the core plate. Adjacent the fuel assembly end and leg members, an outwardly extending end wall portion is internally tapered and defines a thimble accommodating opening smaller in diameter than the cylindrical body portion. The tapered internal end surface helps locate the shield during assembly. A fuel assembly engaging flat surface portion of the end wall surrounds the opening for additional anti-tipping support of the fuel assembly.

DESCRIPTION OF THE PREFERRED EMBODIMENT

The numeral 10 generally designates a pressurized water nuclear reactor having bottom mounted in-core-instrumentation guide tubes 12 connected to a seal table 14 in a manner well known in the art.

Figure 1:
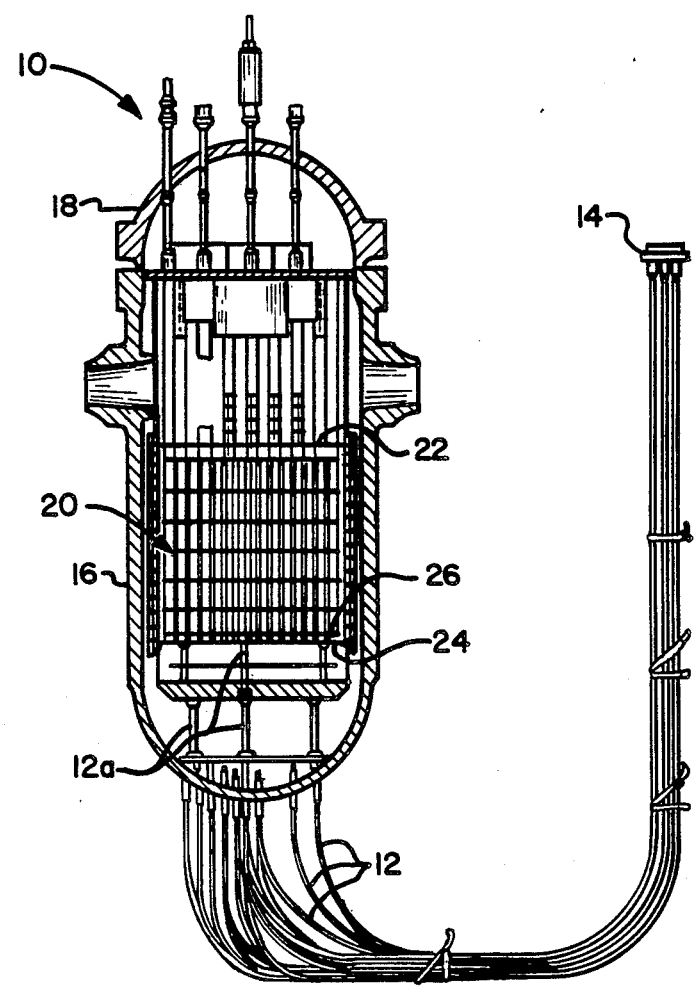
FIG. 1 is a schematic elevational view of a pressurized water nuclear reactor of the type which has in-core-instrumentation thimbles and thimble guide tubes and which can be improved by use of the novel shield of the invention.

The reactor 10 includes a vessel 16 and vessel head 18 and a core 20 made up of a plurality of fuel assemblies. The core 20 has an upper core plate 22 above it and a lower core plate 24 below it. The fuel assemblies of core 20 each have a flow distribution plate 26 spaced from and located above the lower core plate 24. A plurality of instrument thimble guide tubes 12a are shown within the reactor vessel schematically. These thimble guide tubes 12a guide the in-core-instrumentation thimble tubes or thimbles 30 up through the bottom of vessel 16, the openings 32 in core support plate 24 and openings 34 in the fuel assembly flow distribution plate 26. These thimbles 30 provide the guide path for the insertion of moveable nuclear flux detectors (not shown) used for reactor operations. Other reactor structure of FIG. 1 is not pertinent to the invention description.

Without the wear-reduction-shield, the majority of the in-core-instrumentation thimble wear in reactor 20 will occur because of flow induced vibration in the very narrow annulus between opening 34 and thimble 30. Shielding of the otherwise exposed thimble tube from normal reactor flow excitation, thus minimizes or eliminates a major source of thimble tube excitation. The excitation forces that would be produced by the thimble flow stream are curtailed by the shield.

The reduction of flow induced vibration and thus, the extended life, is due in a major part to a wear-reduction-shield which is generally designated by the numeral 40.

The wear-reduction-shield 40 provides reduced excitation forces in a particular region of length of thimble 30. The region of length of thimble 30 extends through and defines an open annulus with the wall of opening 32 of core support plate 24 and extends upwardly to and through opening 34 in the illustrated area of the fuel assembly flow distribution plate 26 spaced from the core support plate 24. There are a plurality of wear-reduction-shields 40 for each fuel assembly of core 20.

The wear-reduction-shield 40 includes a lower hollow cylindrical body portion 42. The cylindrical body portion 42 has an annular surface portion 44 on its lower end which engages core plate 24 and is normal to the axis of the cylindrical body portion. Its diameter is such that it can accommodate sleeve-like structures or thimble securing nuts and or welds.

At its upper end, the cylindrical body portion 42 has a tapered internal end wall 46 which, at its outer and smaller end, defines a circular opening 4B for the thimble 30 extending through and coaxialy with the cylindrical body portion 42. The diameter of the opening 48 is smaller than that of cylindrical body portion 42 due to the taper which is provided to assist in passage of the monitor and cable therethrough during insertion of the instrumentation from below in known manner. The diameter dimensions of the cylindrical body portion 42 and tapered end wall 46 are such as to accommodate any flow directing or diverting sleeve structure such as the wear-reduction sleeve 50 of the above-mentioned Ser. No. 226,109, filed July 28, 1988.

On the outside of the wear-reduction-shield 40 tapered end wall 46 are means for engagement with the lower side of the fuel assembly flow distribution plate 26 at a plurality of symmetrically located points radially beyond the cylindrical body portion 42. The means for engagement are leg portions or reinforcing ligaments 52 which permit the shields 40 to act as additional supporting legs for the lower end fitting 26 and to provide an anti-tipping function in the event lower end fitting legs enter any flow holes 32 of core plate 24 during fueling or re-fueling. A central "land" or surface 54 which surrounds opening 48 adds to the anti-tipping and support function. The added support permits a reduction in thickness of the flow distribution plate 26 which can increase fuel length or fuel rod growth space.

Figure 2:
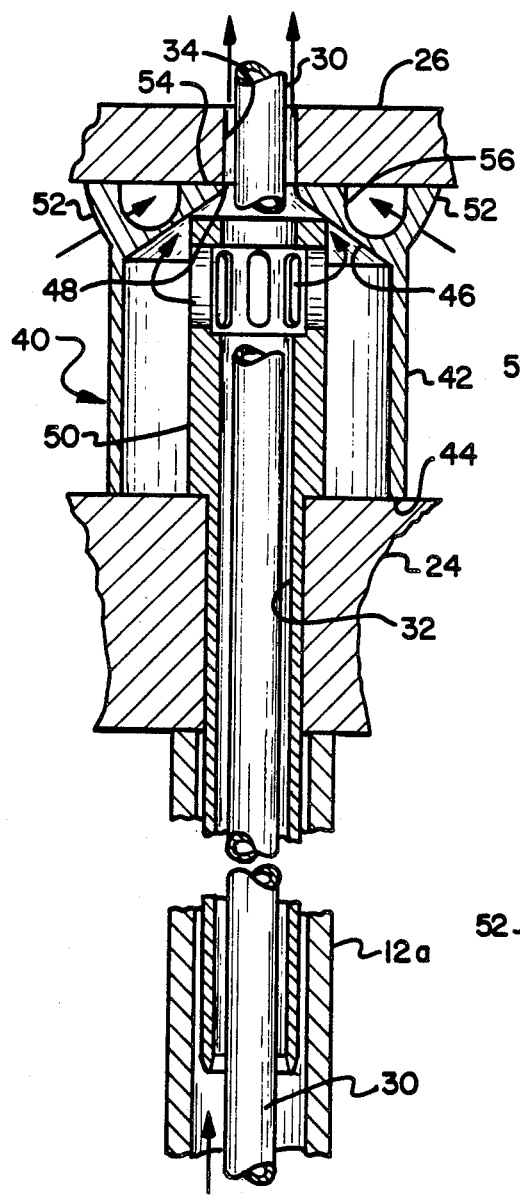
FIG. 2 is a schematic cross-sectional elevational view of the novel shield of the invention in place in a reactor of the type illustrated in FIG. 1 and surrounding a wear-reduction-sleeve.
Figure 3:
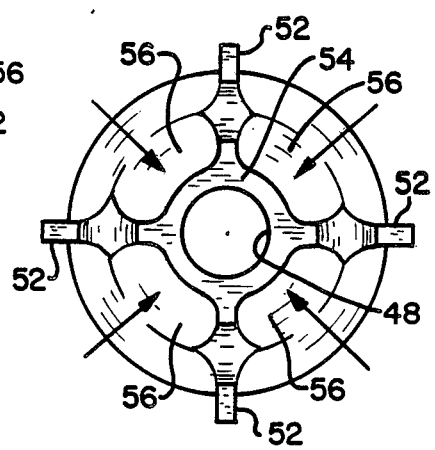
FIG. 3 is a plan view of the shield shown in use in FIG. 2.
Figure 4:
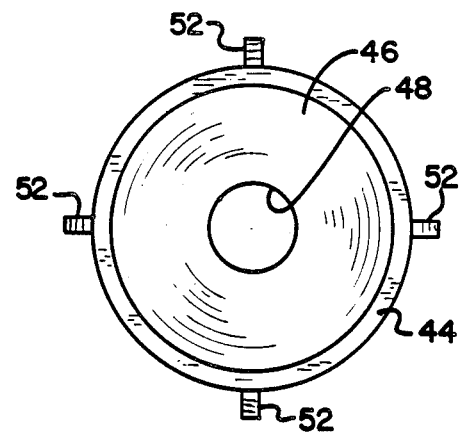
FIG. 4 is a bottom view of the shield shown in use in FIG. 2.

The upper end of the wear-reduction-shield 40 between leg portions 52 defines a surface 56 so that flow transition from the larger diameter of the cylindrical portion 42 of the body to the smaller diameter of the thimble 30 can be accomplished smoothly with a minimum of flow restriction due to the shield 40, itself. The tapered structure and openings allow flow as shown by the arrows in FIGS. 2 and 3 to redistribute in uniform flow once it has passed through the lower end fitting 26.

I claim:

1. A wear-reduction-shield for thimbles of pressurized water nuclear reactors to reduce flow-induced vibrations in a thimble length portion located between a fuel assembly and a core plate upon which the fuel assembly sits and to provide stability to the fuel assembly and thereby reduce its ability to tip relative to the core plate, said shield comprising:
   a hollow generally cylindrical body portion having a core plate engaging surface portion;
   a tapered internal end wall portion defining a circular opening for a thimble coaxial with the cylindrical body portion and of a diameter smaller than the diameter of the cylindrical body portion: and
   means on said body portion for engagement with the fuel assembly at a plurality of symmetrically located points radially beyond the cylindrical body portion.

2. The wear-reduction-shield of claim 1 in which the means on said body portion for engagement with the fuel assembly are leg portions adjacent the tapered end wall.

3. The wear-reduction-shield of claim 1 in which the core plate engaging surface portion is normal to the axis of the cylindrical body.

4. The wear-reduction-shield of claim 1 in which a fuel assembly engaging surface portion of the end wall surrounds the opening.

* * * * *